US010457107B2

(12) United States Patent
Lindemann et al.

(10) Patent No.: US 10,457,107 B2
(45) Date of Patent: Oct. 29, 2019

(54) ASSEMBLY FOR RECEIVING A SUSPENSION SPRING OF A SUSPENSION STRUT, AND ASSOCIATED SPRING SEAT

(71) Applicants: ThyssenKrupp Bilstein GmbH, Ennepetal (DE); ThyssenKrupp AG, Essen (DE)

(72) Inventors: Jürgen Lindemann, Baesweiler (DE); Frank Meurer, Bedburg (DE); Michael Dodt, Wetter (DE); Stefan Mages, Hürth (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 48 days.

(21) Appl. No.: 15/303,473

(22) PCT Filed: Apr. 14, 2015

(86) PCT No.: PCT/EP2015/058040
§ 371 (c)(1),
(2) Date: Oct. 11, 2016

(87) PCT Pub. No.: WO2015/158698
PCT Pub. Date: Oct. 22, 2015

(65) Prior Publication Data
US 2017/0028804 A1 Feb. 2, 2017

(30) Foreign Application Priority Data
Apr. 15, 2014 (DE) .................. 10 2014 105 361

(51) Int. Cl.
*F16F 9/36* (2006.01)
*B60G 15/06* (2006.01)
(Continued)

(52) U.S. Cl.
CPC ......... *B60G 15/063* (2013.01); *B60G 15/062* (2013.01); *F16F 1/12* (2013.01);
(Continued)

(58) Field of Classification Search
USPC ....... 267/170, 174, 178, 179, 219, 220, 221; 280/124.1–124.179
See application file for complete search history.

(56) References Cited

U.S. PATENT DOCUMENTS 1,671,895 A * 5/1928 Fritz ................ F16B 15/08
411/447
1,895,656 A * 1/1933 Gadke ............... A47G 33/105
24/339
(Continued)

FOREIGN PATENT DOCUMENTS

CN 102959272 A 3/2013
DE 9109020 U1 10/1991
(Continued)

OTHER PUBLICATIONS

Int'l Search Report for PCT/EP2015/058040 dated Jul. 10, 2015 (mailed Jul. 17, 2015).
English Language Abstract for DE102011051403.

*Primary Examiner* — Christopher P Schwartz
(74) *Attorney, Agent, or Firm* — thyssenkrupp North America, Inc.

(57) ABSTRACT

An arrangement for mounting a suspension spring of a spring strut for a motor vehicle may include a spring plate that is arranged on a damper tube of a vibration damper of the spring strut such that an end side of the suspension spring is supported on the spring plate. A protective element for protecting a piston rod of the vibration damper may also be attached to the spring plate. The spring plate may include features that help minimize or even eliminate contact between the protective element and the damper tube. For example, the spring plate may include tongues that extend from a ring-shaped main structure of the spring plate, (Continued)

wherein inner sides of the tongues may lie against the damper tube and outer sides of the tongues may guide the protective element.

17 Claims, 3 Drawing Sheets

(51) Int. Cl.
    *F16F 9/38*     (2006.01)
    *F16F 1/12*     (2006.01)
    *F16F 13/00*     (2006.01)

(52) U.S. Cl.
    CPC .............. *F16F 9/38* (2013.01); *F16F 13/007* (2013.01); *B60G 2202/143* (2013.01); *B60G 2204/1242* (2013.01); *B60G 2206/7104* (2013.01)

(56) References Cited

U.S. PATENT DOCUMENTS

| | | | | |
|---|---|---|---|---|
| 3,251,591 A | * | 5/1966 | McNally | B60G 15/063 |
| | | | | 267/221 |
| 3,383,639 A | * | 5/1968 | Anderson | H01R 13/6392 |
| | | | | 403/286 |
| 4,981,287 A | * | 1/1991 | Cothenet | B60G 13/001 |
| | | | | 267/153 |
| 5,678,810 A | * | 10/1997 | Summers, III | B60G 17/0521 |
| | | | | 267/220 |
| 7,032,896 B2 | * | 4/2006 | Collis | F16F 9/38 |
| | | | | 188/322.17 |
| 8,070,144 B2 | * | 12/2011 | Lamb | B60G 11/22 |
| | | | | 267/220 |
| 9,227,477 B2 | * | 1/2016 | Karl | B60G 15/06 |
| 2002/0163156 A1 | | 11/2002 | Sasse | |
| 2003/0209395 A1 | * | 11/2003 | Fukaya | B60G 11/14 |
| | | | | 188/322.12 |
| 2013/0043625 A1 | * | 2/2013 | Mrugalla | F16F 9/38 |
| | | | | 267/140.13 |
| 2014/0232084 A1 | * | 8/2014 | Suzuki | F16F 1/12 |
| | | | | 280/124.179 |

FOREIGN PATENT DOCUMENTS

| | | |
|---|---|---|
| DE | 19641728 A1 | 4/1998 |
| DE | 10121537 C1 | 7/2002 |
| DE | 10122796 A1 | 12/2002 |
| DE | 102007018161 A1 | 10/2008 |
| DE | 102010004204 A1 | 8/2011 |
| DE | 102010018044 A1 | 10/2011 |
| DE | 102011051403 A1 | 1/2013 |

* cited by examiner

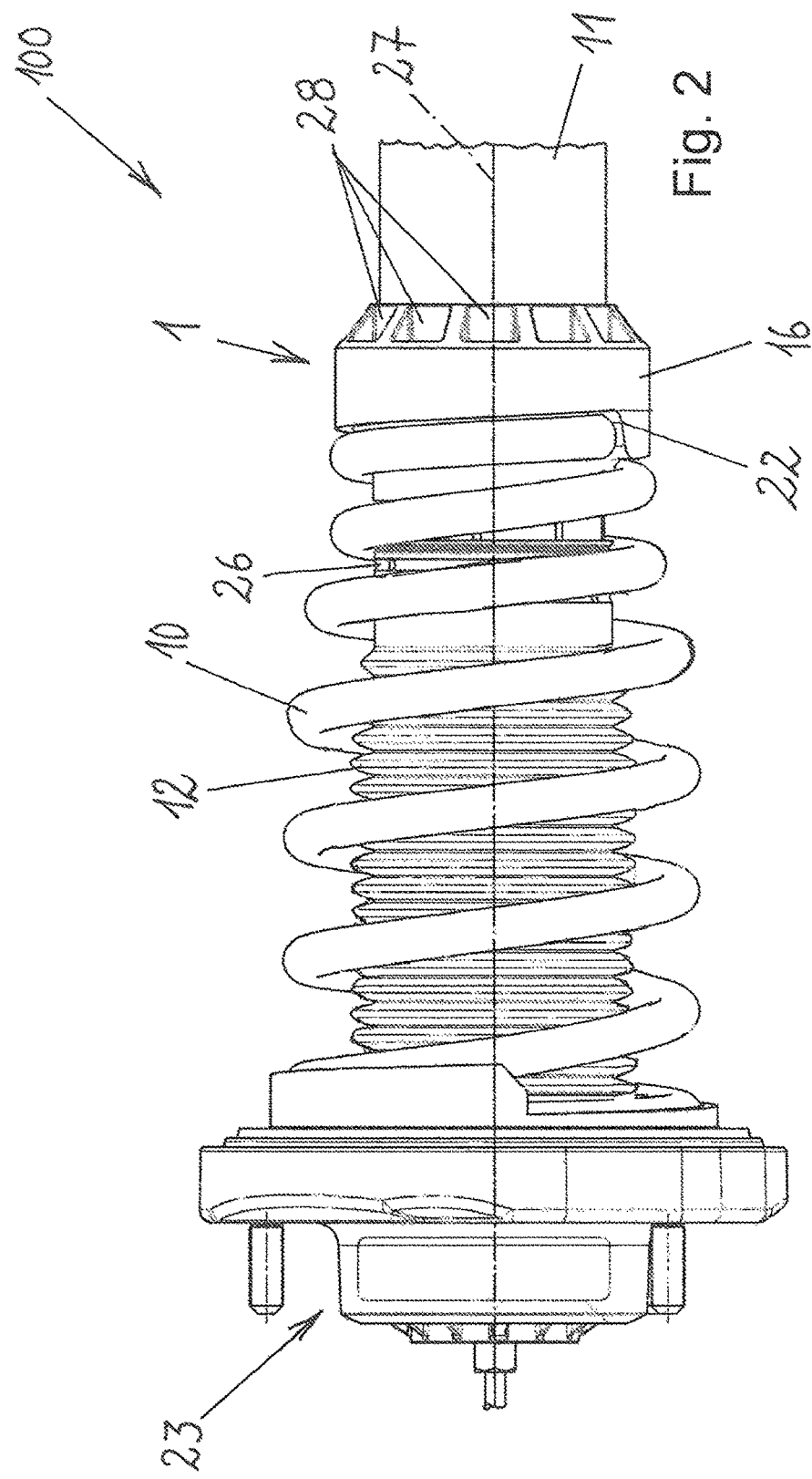

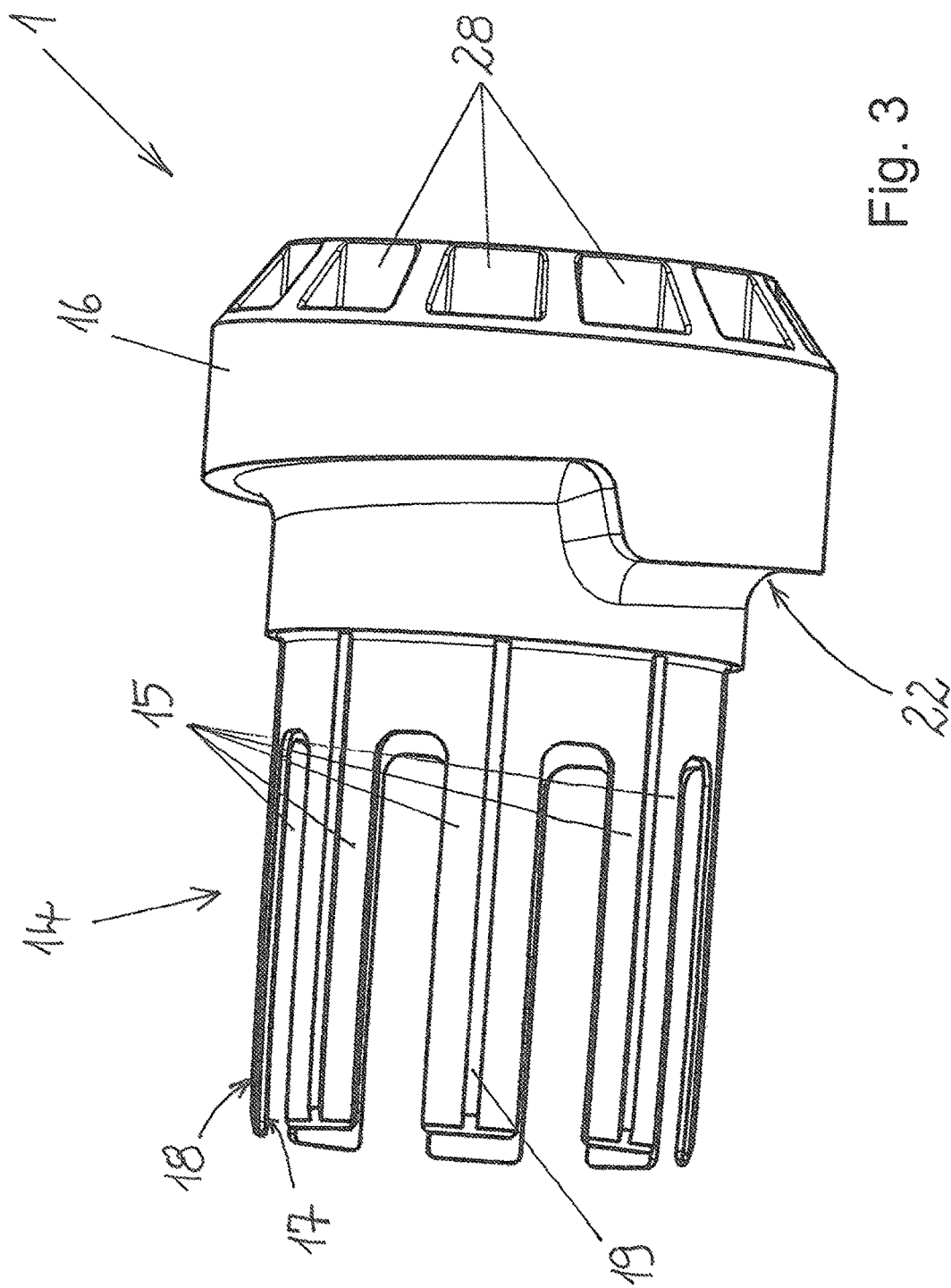

ASSEMBLY FOR RECEIVING A SUSPENSION SPRING OF A SUSPENSION STRUT, AND ASSOCIATED SPRING SEAT

CROSS REFERENCE TO RELATED APPLICATIONS

This application is a U.S. National Stage Entry of International Patent Application Serial Number PCT/EP2015/058040, filed Apr. 14, 2015, which claims priority to German Patent Application No. DE 10 2014 105 361.3 filed Apr. 15, 2014, the entire contents of both of which are incorporated herein by reference.

FIELD

The present disclosure relates to spring struts for motor vehicles and, more particularly, to arrangements for mounting suspension springs of spring struts.

BACKGROUND

DE 10 2010 018 044 A1 has disclosed an arrangement for the mounting of a suspension spring of a spring strut for a motor vehicle, and the arrangement comprises, as a central element, a spring plate which is arranged on a damper tube of a vibration damper of the spring strut, such that an end side of the suspension spring, shown in the figures by the lower end side, is supported on the spring strut. The upper end side of the suspension spring is mounted in a damper bearing. The damper tube is a constituent part of a vibration damper, and a piston rod extends out of the damper tube, which piston rod is protected by way of a protective element. The protective element is in the form of a corrugated bellows and is held on a cap which is arranged on the end of the damper tube.

The protective cap serves for preventing the ingress of contaminants and moisture into the region in which the piston rod is led out of the damper tube. The closure element for leading the piston rod out of the damper tube is referred to as closure assembly, and comprises a stripper and seals and guide elements for the piston rod. Without the protective element, contaminants would accumulate on the piston rod and damage the closure assembly, which can lead to failure of the vibration damper.

The fact that the protective element is held on the cap and thus on the end side of the damper tube of the vibration damper necessitates a special design of the cap of pot-shaped form, which yields disadvantages in the mounting of the cap that must be arranged on the damper tube. At the same time, the lower end of the protective element must be arranged on the cap, for which purpose the cap comprises an outer shell region on which a spring tongue, a spreading element, a stop surface and further features are required. The construction of the cap is thus quickly made complicated, and can be produced only with increased outlay. The cumbersome construction of the cap arises exclusively owing to the fact that it holds the protective element, without which the cap could be of much simpler design. The cap basically serves for forming a stop for a stop buffer, which dampens an end stop during the retraction of the piston rod into the damper tube.

BRIEF DESCRIPTION OF THE FIGURES

FIG. 2 is a side view of the example spring strut of FIG. 1.

FIG. 3 is a perspective view of an example spring plate for arrangement on a damper tube of a vibration damper as per FIGS. 1-2.

DETAILED DESCRIPTION

Figure 1:
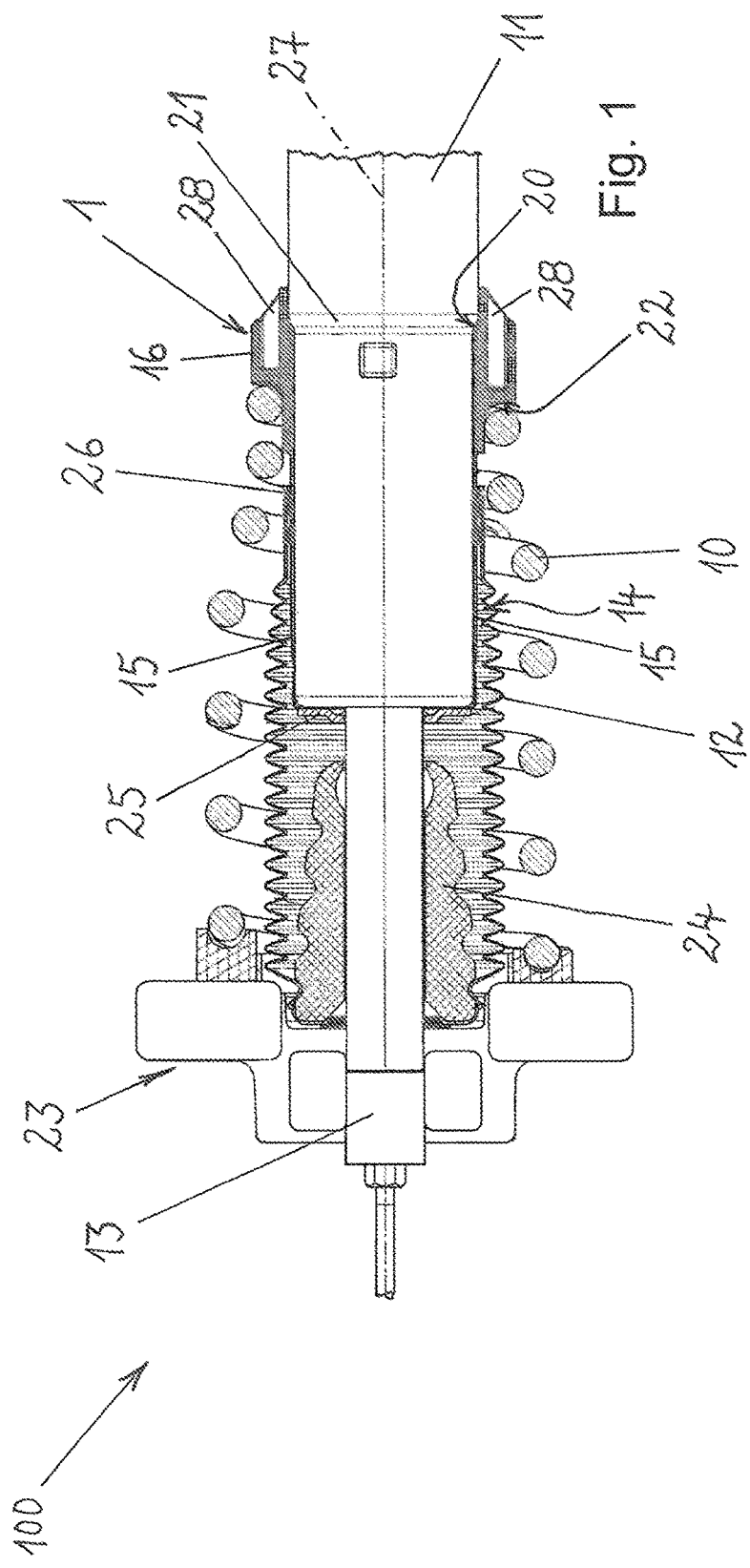
FIG. 1 is a cross-sectional view of an example spring strut with an example arrangement for mounting a suspension spring and a protective element.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Spring struts having a vibration damper and having a suspension spring are known in which the suspension spring is supported by way of the lower side, in relation to the installed position of the spring strut, on the damper tube of the vibration damper. For the support of the end side of the suspension spring, use may be made of a spring plate which is fixedly held on the damper tube of the vibration damper. The opposite end side of the suspension spring, which, depending on the installed position of the spring strut, may point toward the vehicle frame, may be held on a damper bearing or head bearing. The spring strut can finally be fastened to the vehicle frame by way of the damper bearing or head bearing. Here, the steering knuckle for forming the axle and for holding the wheel of the vehicle is fastened to the lower end side of the damper tube of the vibration damper, wherein such a construction of a spring strut is, taking into consideration further features, referred to as a so-called MacPherson spring strut.

The present disclosure generally concerns arrangements for mounting a suspension spring of a spring strut for a motor vehicle, which may include a spring plate arranged on a damper tube of a vibration damper of the spring strut, such that an end side of the suspension spring is supported on the spring plate.

Further, one example object of the present disclosure is to realize improved attachment of a protective element for protecting a piston rod of a vibration damper as part of a spring strut for a motor vehicle.

The invention encompasses the technical teaching whereby the protective element for protecting a piston rod of the vibration damper is attached to the spring plate.

By way of the attachment according to the invention of the protective element to the spring plate, it is possible for a cumbersome design of a cap on the end side of the damper tube to be eliminated, and the protective element, formed for example by a corrugated bellows, can realize the same protective action in order to prevent the ingress of contaminants into the guide region of the piston rod of the vibration damper. In particular, the protective element may be already arranged on the spring plate, and the spring plate together with the protective element can be pushed onto the damper tube of the vibration damper. Thus, cumbersome mounting of a cap arranged on the end side of the damper tube, together with the arrangement of the protective element, are also eliminated, whereby the assembly process of the spring strut is made easier. Furthermore, a situation in which contaminants can enter between the pot-like cap and the end side of the damper tube is avoided, which contaminants can likewise damage the closure assembly for leading the piston rod out of the damper tube. Specifically, during the attachment of the protective element to the spring plate, the closure assembly with the cap for the stop of the stop buffer is already situated in the region protected by the protective element, such that the cap on the end side of the damper tube is not exposed to contaminants or moisture.

In an advantageous refinement of the spring plate designed according to the invention, said spring plate may comprise guide means for guiding the protective element, by way of which guide means contact between the protective element and the damper tube is prevented. In this way, a rubbing action between the inner side of the protective element and the outer side of the damper tube is prevented.

It is furthermore advantageously possible for the spring plate to be formed in one piece with the guide means and, in order for the spring plate to be of the most lightweight possible design, said spring plate may be formed from a plastics material. The spring plate may for example be produced from a polyamide, such that the spring plate exhibits high strength and can be produced easily by way of a plastics injection molding process.

The guide means may be formed by lugs or tongues that are integrally formed on the spring plate, and the spring plate may for example comprise a ring-shaped main structure, wherein the lugs or tongues are integrally formed on a face side of the ring-shaped main structure so as to extend axially from said face side. Instead of the tongues or lugs, the guide means may be formed as a thin-walled tube section which is of circumferentially closed form and which adjoins the face side of the ring-shaped base structure so as to extend axially from said face side.

The tongues, which can also be referred to as lugs, may form a crown-like shape on the face side of the ring-shaped main structure, and the crown formed by the tongues may surround the outer side of the damper tube at regular intervals with the lugs. In this way, contact between the protective element and the outer side of the damper tube is prevented, such that the protective element, during a movement relative to the damper tube, is not subject to any wear. It is particularly advantageously possible for the tongues to be formed such that, when the spring plate is arranged on the damper tube, said tongues lie by way of their inner side against the damper tube or at least adjoin the latter at its outer side, and on the outer side, the tongues may form a guide for the protective element. In particular, guide strips may be attached to the outer side of the tongues, which guide strips extend longitudinally and thus form a guide in the direction of movement of the protective element over the damper tube during a compression movement of the spring strut.

The tongues for guiding the protective element may in particular form, with the guide strips, a guide body by way of which the protective element, formed in particular by a corrugated bellows, can be guided in contact-free fashion from its inner side over the full length of the damper tube. The tongues on the ring-shaped main body of the spring plate may be formed with such a length that they extend as far as the end of the damper tube, such that contact between the protective element and the damper tube is prevented over the entire length of the damper tube that runs through the protective element. For example, the ends of the guide means may extend to a short distance in front of, or as far as, the stop cap which is attached to the end of the damper tube and which forms the stop for the stop buffer.

The spring plate may comprise, on the inner side and in particular in the ring-shaped main structure, a supporting shoulder which is of complementary form with respect to a tube shoulder formed in the damper tube. If the spring plate is pushed over the damper tube, the supporting shoulder enters into positively locking engagement with the tube shoulder, such that the spring plate can be acted on in an axial direction of the damper tube with the support force of the suspension spring. Here, the suspension spring comprises a diameter which is larger than the outer diameter of the protective element, such that the protective element can run through the suspension spring at the inside. Here, the suspension spring is supported by way of a corresponding spring mount, and, within the spring mount, the guide means, that is to say the lugs or tongues, can adjoin the main structure in an axial direction. Here, the mounting of the suspension spring on the ring-shaped main structure remains uninfluenced by the design of the guide means and of the mounting of the protective element on the spring plate.

The object of the invention is furthermore achieved by way of a spring plate for arrangement on a damper tube of a vibration damper of a spring strut for a motor vehicle such that an end side of a suspension spring of the spring strut can be supported on the spring plate. Here, according to the invention, the spring plate is designed for the attachment of a protective element for protecting a piston rod of the vibration damper. The spring plate may comprise a ring-shaped main structure, and on the ring-shaped main structure there may be arranged guide means, wherein contact between the protective element and the damper tube can be prevented by way of the guide means.

The guide means of the spring plate may form lugs or tongues which are integrally formed on a face side of the ring-shaped main structure so as to extend axially from said face side. Here, the lugs or the tongues may be designed such that, when the spring plate is arranged on the damper tube, said lugs or tongues lie by way of their inner side against the damper tube or at least adjoin the latter at its outer side, and on the outer side, a guide for the protective element may be formed. In particular, the outer side may comprise guide strips through which the protective element can be guided. The guide means, that is to say the lugs or tongues, may be formed in one piece with the ring-shaped main structure, and the spring plate with the ring-shaped main structure and the guide means may for example be produced by way of a plastics injection molding process. In this way, the advantage is achieved that the spring plate comprises a particularly low weight, and the protective element can be formed by a corrugated bellows, such that the spring plate comprises an integrated corrugated-bellows guide by way of the guide means.

FIG. 1 shows, in a cross-sectional view, a spring strut 100 with a vibration damper which is shown with a damper tube 11 and with a piston rod 13. The spring strut 100 furthermore comprises a suspension spring 10 which, by way of one end side, is supported via a spring plate 1 on the damper tube 11 of the vibration damper, and the suspension spring 10 is mounted by way of a further end side on a damper bearing 23. By way of the damper bearing 23, the spring strut 100 can be attached for example to the frame of a motor vehicle.

To protect the piston rod 13, a protective element 12 is provided which is in the form of a corrugated bellows, and the protective element 12 surrounds the piston rod 13 and seals off the region of the piston rod 13 such that no contaminants and no moisture can pass to the piston rod 13.

A stop buffer 24 is arranged in the interior region of the protective element 12 and is fastened to the damper bearing 23, and when the piston rod 13 is retracted into the damper tube 11, that is to say during a compression movement of the spring strut 100, the stop buffer 24 can abut against a cap 25 which is attached to the end side of the damper tube 11.

According to the invention, the spring plate 1 is designed for the attachment of an end side of the protective element 12, and, by way of the end side, the protective element 12 is connected to the spring plate 1 by way of a connecting point 26. The spring plate 1 comprises a ring-shaped main structure 16, and the spring plate 1 comprises guide means 14 which are, by way of example, in the form of tongues 15, and the tongues 15 are integrally formed on a face side of the ring-shaped main structure 16 so as to extend axially from said face side.

The tongues 15 are designed such that, in an arranged state of the spring plate 1, said tongues lie against the outside of the damper tube 11. In this way, contact between the inner side of the protective element 12 and the outer side of the damper tube 11 is prevented, and the tongues 15 serve as guide means 14 by way of which the protective element 12 is guided around the outside of the damper tube 11. Consequently, for the guidance of the protective element 12, the connecting point 26 for the attachment of the protective element 12 to the spring plate 1 is situated, as viewed in the longitudinal direction 27, between the guide means 14 and the ring-shaped main structure 16.

The suspension spring 10 is supported, so as to impart an axial force in the longitudinal direction 27, via a spring receptacle 22 on the spring plate 1, such that the spring plate 1 is acted on in the longitudinal direction 27 with a spring force. For the support of the spring plate 1 on the damper tube 11, the spring plate 1 comprises a supporting shoulder 20 which is of complementary form with respect to a tube shoulder 21 which is formed in the damper tube 11. The spring mount 22 for the mounting of the suspension spring 10 on the spring plate 1 is in the form of a shoulder on the ring-shaped main structure 16 of the spring plate 1, and the ring-shaped main structure 16 comprises hollow chambers 28 such that the spring plate 1, while maintaining a high stiffness, in particular for the stiffening of the spring mount 22, comprises a low weight, in particular by virtue of the spring plate 1 additionally being formed from a plastics material.

FIG. 2 shows the spring strut 100 as per FIG. 1 in a non-sectional view, which spring strut extends in the longitudinal direction 27, and the longitudinal direction 27 simultaneously forms a longitudinal direction of the damper tube 11 of a vibration damper which is a constituent part of the spring strut 100. The protective element 12 in the form of a corrugated bellows is arranged over the piston rod (not visible) of the vibration damper, and a suspension spring 10 is arranged between the damper bearing 23 and a spring plate 1, which suspension spring surrounds the protective element 12. The spring plate 1 is designed for the mounting of the protective element 12, and a connecting point 26 attaches the lower side of the protective element 12 to the spring plate 1.

The spring plate 1 comprises a ring-shaped main structure 16, and the main structure 16 comprises a spring mount 22 in which the end side of the suspension spring 10 is seated. The connecting point 26 for the attachment of the protective element 12 is in this case situated within the suspension spring 10 and thus, as viewed in the longitudinal direction 27, already lies in a position facing toward the damper bearing 23 in relation to the main structure 16 of the spring plate 1.

The ring-shaped main structure 16 comprises hollow chambers 28 for the purposes of reducing the weight of the spring plate 1, which is formed from a plastics material. FIG. 3 shows a perspective view of the spring plate 1.

FIG. 3 shows a spring plate 1 for arrangement on the damper tube of a vibration damper in order, for the purposes of forming a spring strut, to support a suspension spring on the damper tube. For this purpose, the spring plate 1 comprises a ring-shaped main structure 16 with a spring receptacle 23, and the ring-shaped main structure 16 comprises hollow chambers 28 for the purposes of reducing the weight and for the purposes of simultaneously maintaining a high level of stiffness and for the purposes of supporting the spring mount 22.

The ring-shaped main structure 16 of the spring plate 1 is adjoined by guide means 14 in the form of tongues 15. If the spring plate 1 is fitted onto the damper tube of the vibration damper, the inner sides 17 of the tongues 15 lie against the outer side of the damper tube, and, by way of the outer side 18, the protective element can be guided for the purposes of protecting the piston rod of the vibration damper. For improved guidance, the outer sides 18 of the tongues 15 comprise guide strips 19.

The guide means 14 are integrally formed on a face side of the ring-shaped main structure 16 so as to extend axially from said face side, wherein the face side with the guide means 14 is situated opposite the face side which comprises the hollow chambers 28 for the purposes of stiffening the main body 16.

The invention is not restricted in terms of its embodiment to the preferred exemplary embodiment specified above, rather, numerous variants are conceivable which make use of the presented solution even in the case of fundamentally different embodiments. All of the features and/or advantages that emerge from the claims, from the description or from the drawings, including structural details or spatial arrangements, may be essential to the invention both individually and in a wide variety of combinations.

What is claimed is:

1. A spring strut comprising:
    a piston rod;
    a protective element that surrounds the piston rod and protects the piston rod from at least one of contaminants or moisture;
    a suspension coil spring; and
    a plastic spring plate that is positioned on a damper tube and supports an end of the suspension spring, wherein the spring plate is attached to the protective element and is configured to guide the protective element around an outside of the damper tube so as to minimize contact between the protective element and the damper tube.

2. The spring strut of claim 1 wherein the spring plate comprises tongues extending from a ring-shaped main structure.

3. The spring strut of claim 2 wherein the tongues are parallel to a longitudinal axis occupied by the piston rod.

4. The spring strut of claim 2 wherein inner sides of the tongues face the damper tube and outer sides of the tongues contact the protective element and space the protective element from the damper tube.

5. The spring strut of claim 2 wherein the tongues and the ring-shaped main structure are integrally formed.

6. The spring strut of claim 2 wherein outer sides of the tongues comprise guide strips for guiding the protective element.

7. The spring strut of claim 1 wherein the end of the suspension coil spring supported by the spring plate is a first end, the spring strut further comprising a damper bearing that supports a second end of the suspension coil spring and is securable to a frame of a motor vehicle.

8. The spring strut of claim 7 further comprising a stop buffer disposed within the protective element and fastened to the damper bearing, wherein when the piston rod is compressed into the damper tube the stop buffer abuts a cap attached to the damper tube.

9. The spring strut of claim 1 wherein an inner side of the spring plate comprises a supporting shoulder that is of complementary form with respect to a tube shoulder of the damper tube.

10. An arrangement for mounting a suspension coil spring of a spring strut for a motor vehicle, the arrangement comprising:
    a spring plate positioned on a damper tube of a vibration damper of the spring strut such that an end side of the suspension coil spring is supported on the spring plate, wherein the spring plate comprises plastic; and
    a protective element for protecting a piston rod of the vibration damper, the protective element attached to the spring plate,
    wherein the spring plate further comprises guide means for guiding the protective element and preventing contact between the protective element and the damper tube, wherein the guide means comprises tongues that are integrally formed on a ring-shaped main structure of the spring plate, wherein inner sides of the tongues lie against the damper tube.

11. The arrangement of claim 10 wherein the tongues are integrally formed on a face side of the ring-shaped main structure so as to extend axially from the face side.

12. The arrangement of claim 10 wherein the tongues include outer sides that comprise guide strips by way of which the protective element can be guided.

13. The arrangement of claim 10 wherein an inner side of the ring-shaped main structure of the spring plate comprises a supporting shoulder that is of complementary form with respect to a tube shoulder of the damper tube.

14. The arrangement of claim 10 wherein the ring-shaped main structure of the spring plate and the guide means of the spring plate are integrally formed.

15. A spring plate for arrangement on a damper tube of a vibration damper of a spring strut for a motor vehicle such that an end side of a suspension coil spring of the spring strut is supportable on the spring plate, wherein the spring plate comprises a plastics material and is configured to be attached to a protective element for protecting a piston rod of the vibration damper, wherein the spring plate comprises guide means for guiding the protective element and preventing contact between the protective element and the damper tube, with the guide means comprising tongues that are integrally formed on a ring-shaped main structure of the spring plate, wherein inner sides of the tongues are configured to lie against the damper tube, wherein outer sides of the tongues are configured such that contact between the protective element and the damper tube is prevented.

16. The spring plate of claim 15 wherein the tongues are integrally formed on a face side of the ring-shaped main structure so as to extend axially from the face side.

17. The spring plate of claim 15 wherein the outer sides comprise guide strips by way of which the protective element can be guided.

* * * * *